(12) United States Patent
McKibbon

(10) Patent No.: US 6,960,990 B2
(45) Date of Patent: Nov. 1, 2005

(54) TELEMATICS VEHICLE SECURITY SYSTEM AND METHOD

(75) Inventor: Douglas J. McKibbon, Farmington Hills, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/284,919

(22) Filed: Oct. 31, 2002

(65) Prior Publication Data

US 2004/0085195 A1 May 6, 2004

(51) Int. Cl.[7] .............................................. B60R 25/10
(52) U.S. Cl. ......................... 340/426.35; 340/426.16; 340/426.36; 340/825.72; 180/287; 307/10.1
(58) Field of Search .................. 340/426.12, 426.35, 340/426.13, 426.31, 426.36, 426.16, 825.69, 340/825.72; 307/10.2, 10.1; 180/287, 167; 123/179.2; 701/3 G

(56) References Cited

U.S. PATENT DOCUMENTS

| | | | | |
|---|---|---|---|---|
| 5,479,148 A | * | 12/1995 | Umemoto | 340/426.36 |
| 5,684,454 A | * | 11/1997 | Nishioka et al. | 340/426.12 |
| 5,801,616 A | * | 9/1998 | Ghazarian et al. | 340/426.36 |
| 5,828,297 A | * | 10/1998 | Banks et al. | 340/426.12 |
| 5,874,889 A | * | 2/1999 | Higdon et al. | 340/426.36 |
| 2003/0169161 A1 | * | 9/2003 | Brown | 340/426.12 |

* cited by examiner

Primary Examiner—Anh V. La
(74) Attorney, Agent, or Firm—Anthony Luke Simon

(57) ABSTRACT

The invention provides a method of and system for authorizing use of a mobile vehicle, in which an entry signal is received and a disarm alarm prompt from an in-vehicle telematics unit is provided in response to the entry signal. A determination is made as to whether a disarm alarm response is received and an authorization procedure is initiated based on the disarm alarm response.

22 Claims, 4 Drawing Sheets

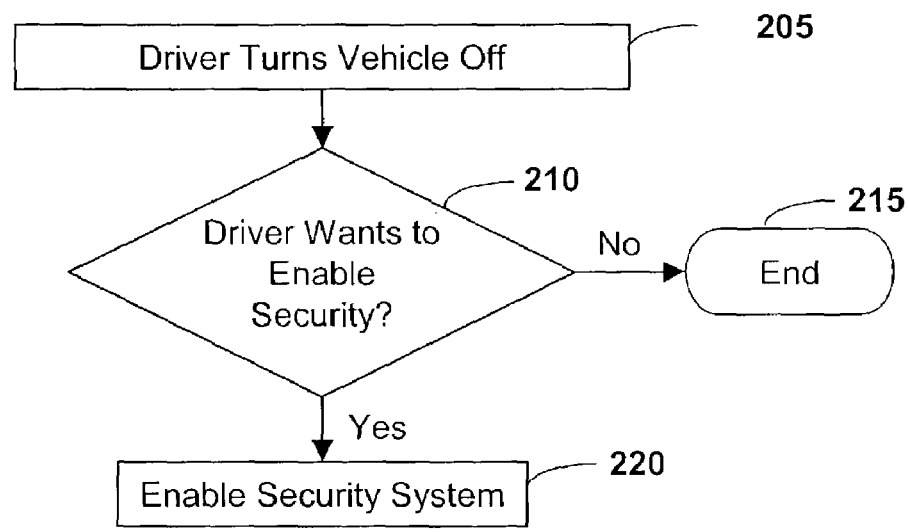

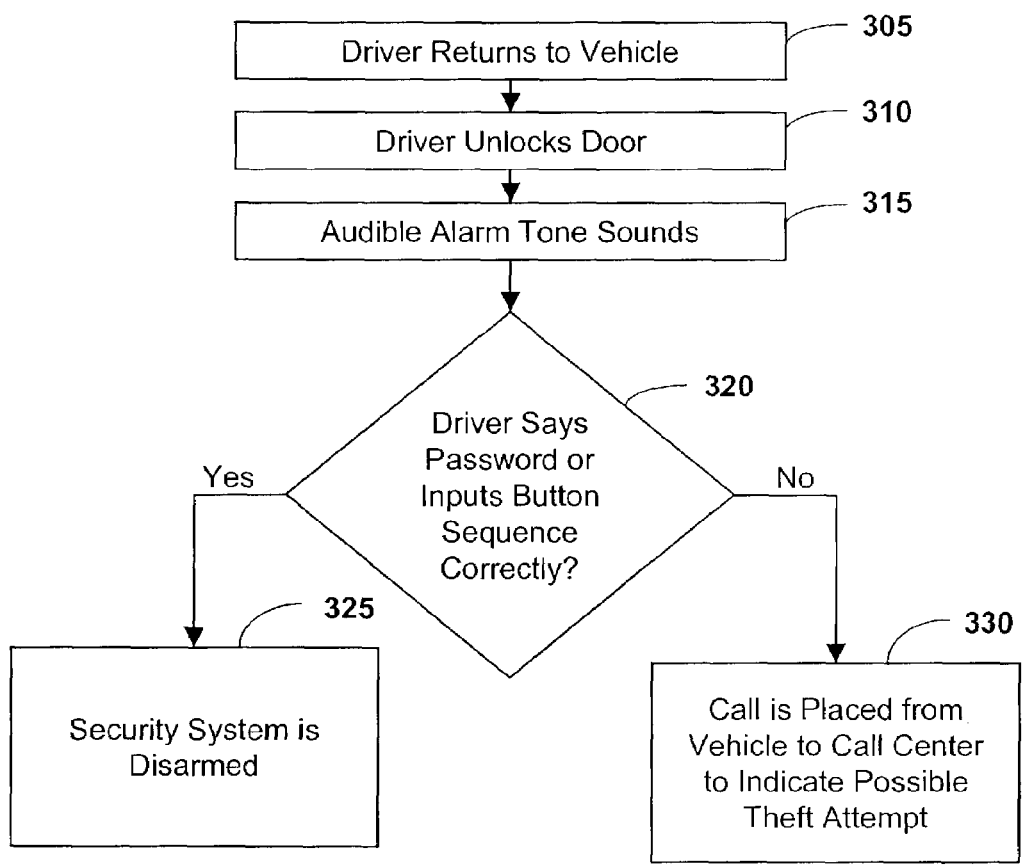

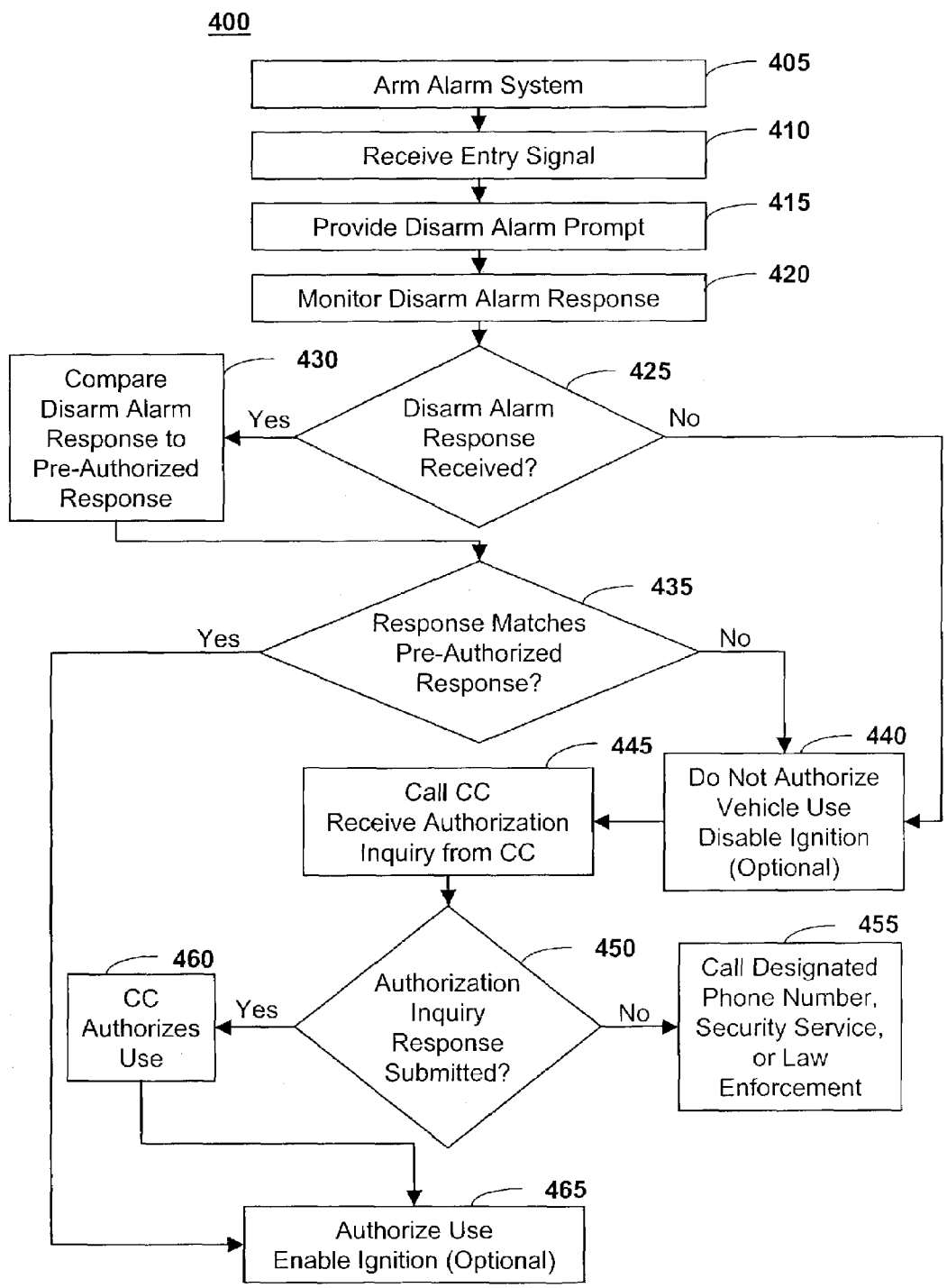

TELEMATICS VEHICLE SECURITY SYSTEM AND METHOD

FIELD OF THE INVENTION

This invention relates generally to vehicle security systems. More specifically, the invention relates to a system and method for providing vehicle security with the telematics services of a call center.

BACKGROUND OF THE INVENTION

The Federal Bureau of Investigation (FBI) reported that over one million vehicles were stolen in the US in each of the years 1998, 1999 and 2000. Auto theft is a $7.5 billion annual industry costing insurance companies and consumers around $20 million per day. The FBI reports that about one-third of stolen vehicles were never recovered and only 14% of the perpetrators were ever caught in 2000.

Consumers spent about $227 million in 2001 for electronic devices to protect automobiles from theft, according to the Consumer Electronics Association. These devices include alarms, keyless entry systems, and vehicle tracking devices with hidden transmitters. Unfortunately, many of these devices and related services for tracking a stolen vehicle require an owner or driver of the vehicle to recognize promptly that a vehicle has been stolen and then to call the police and record the incident, or call a telematics call center to track or disable the vehicle. The owner or driver may not realize the vehicle has been stolen until hours have passed when location and return of the vehicle becomes less likely.

For a vehicle security system to be most effective, it needs to be actively monitored and available 24 hours a day and seven days a week. The active monitoring of a vehicle helps to thwart a thief at the point where the vehicle is being entered and the unauthorized driver is trying to start the vehicle.

It would be beneficial for the security system to leverage current automobile equipment and services. Automotive industry projections indicate that by 2006 almost all new American cars will include telematics equipment providing some level of telematics service. Drivers already can call telematics call centers to receive navigational, concierge, emergency, and location services, as well as other specialized help such as locating the geographical position of a vehicle when it has been stolen. Newer and more convenient security system and service that leverages current automotive equipment such as an in-vehicle telematics unit would help in auto-theft deterrent and recovery without the need of aftermarket equipment. The telematics vehicle security system may provide daily relevance for owners and subscribers of telematics services.

To effectively combat a vehicle theft, a vehicle security method and system should quickly identify an alleged intrusion and generate a response from the telematics call center to the police, car owner, or vehicle intruder. Ideally, this vehicle security system would provide the capability to render a vehicle inoperable without a prescribed authorization of the owner or driver. In addition, the system would alert the owner, law authorities or another security service as to the location of the vehicle. Even if the automobile were somehow started or moved, the system would be able to track the vehicle so that law authorities could recover it.

It is an object of this invention, therefore, to provide a telematics vehicle security system and method to authorize the use of a mobile vehicle using the infrastructure of an in-vehicle telematics unit, a communications network, and a telematics service call center, and to overcome the challenges and obstacles described above.

SUMMARY OF THE INVENTION

The present invention provides a method of and system for authorizing use of a mobile vehicle. After an entry signal is received, a disarm alarm prompt from an in-vehicle telematics unit is provided in response to the entry signal. A determination is made as to whether a disarm alarm response is received, and then an authorization procedure is initiated based on the disarm alarm response.

An authorization inquiry may be received from a call center when the disarm alarm response is not authorized within a prescribed period of time. An authorization inquiry reply may be submitted in response to the authorization inquiry, and a call may be initiated from the call center to a predetermined phone number or a security service based on the authorization inquiry reply. The ignition of the mobile vehicle may be enabled based on the authorization inquiry reply. The in-vehicle alarm system may be armed by a verbal command or a prescribed button push.

Another aspect of the invention provides a computer usable medium that includes a program for authorizing use of the mobile vehicle.

The aforementioned, and other features and advantages of the invention will become further apparent from the following detailed description of the presently preferred embodiments, read in conjunction with the accompanying drawings. The detailed description and drawings are merely illustrative of the invention rather than limiting, the scope of the invention being defined by the appended claims and equivalents thereof.

BRIEF DESCRIPTION OF THE DRAWINGS

These and other features, aspects, and advantages of the present invention will become better understood with regard to the following description, appended claims, and accompanying figures where:

FIG. 2 is a flow diagram of one embodiment of a method for authorizing use of a mobile vehicle with a telematics vehicle security system, in accordance with the current invention;

FIG. 3 is a flow diagram of another embodiment of a method for authorizing use of a mobile vehicle with a telematics vehicle security system, in accordance with the current invention; and FIG. 4 is a flow diagram of another embodiment of a method for authorizing use of a mobile vehicle with a telematics vehicle security system, in accordance with the current invention.

DETAILED DESCRIPTION OF THE PRESENTLY PREFERRED EMBODIMENTS

Figure 1:
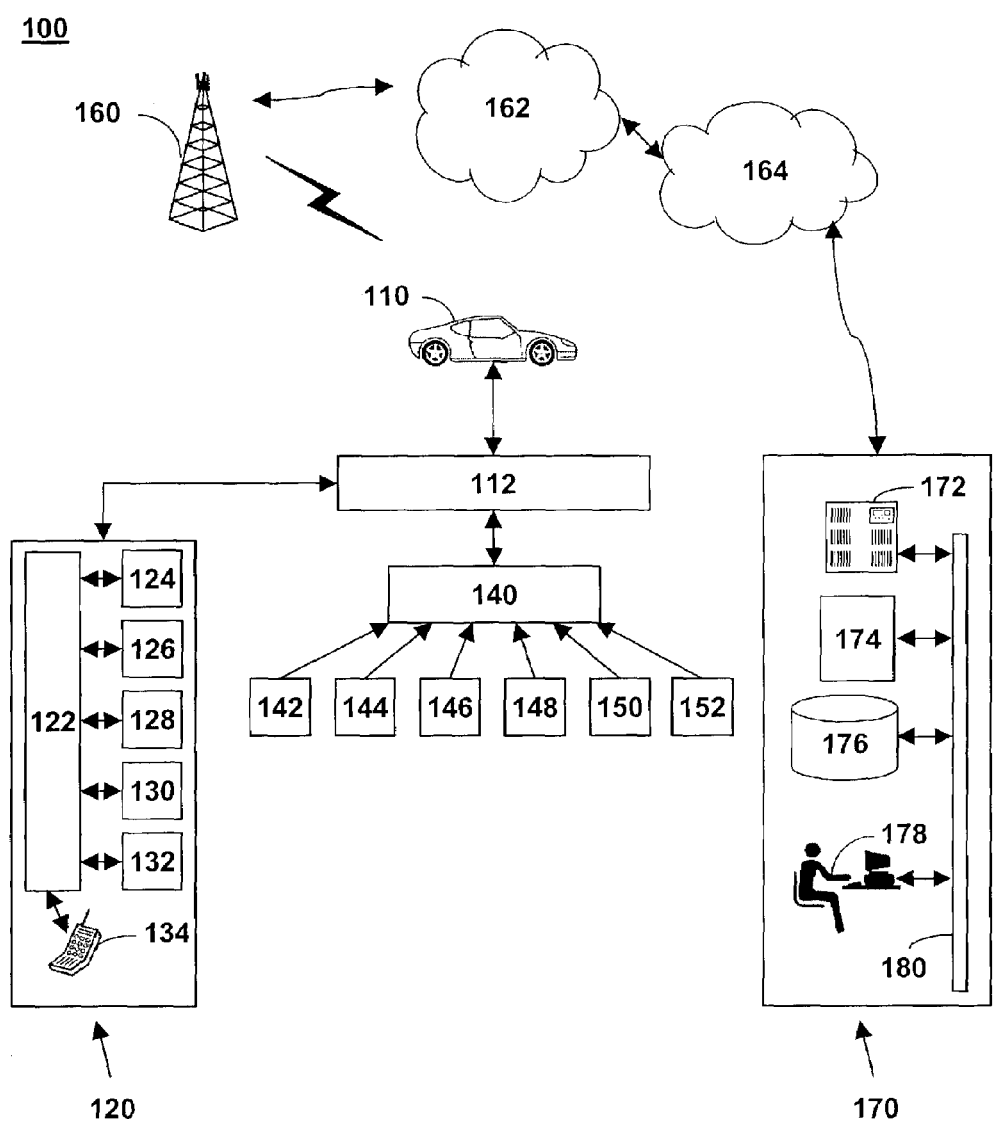
FIG. 1 illustrates one embodiment of a telematics vehicle security system for authorizing use of a mobile vehicle, in accordance with the current invention.

The vehicle security system and method of the present invention employs aspects of the current infrastructure of a mobile vehicle equipped with a telematics unit, a communication network system, and a telematics call center to secure the automobile whenever a driver enables or arms the in-vehicle security system. The system may be activated by entering or verbalizing a specific authorized anti-theft code or command. When the system detects and verifies that there is an intruder who is unable to provide an appropriate authorization to disable the system, an in-vehicle telematics unit may automatically call the owner or a telematics service call center, which in turn, may alert law enforcement or other authorized persons to an unauthorized entry and provide the location of the mobile vehicle from the GPS coordinates of the in-vehicle telematics unit. If proper authorization is not received, the system can prevent a vehicle from being started by an unauthorized user. If the mobile vehicle is started or moved, the system can track the vehicle so that it may be quickly recovered.

FIG.1 illustrates one embodiment of a telematics vehicle security system for authorizing use of a mobile vehicle, in accordance with the present invention at 100. The telematics vehicle security system and method for authorizing use of a mobile vehicle leverages the infrastructure of a vehicle communication bus, telematics unit, wireless and landline networks, and telematics call center. When activated, the telematics vehicle security system monitors any vehicle entry and requires the vehicle occupant to provide a disarm alarm response, such as an authorization code or password, to disable the vehicle security system. When the correct code or password is not received, the telematics unit automatically calls the call center or a prescribed number. A real or virtual advisor at the call center sends back to the vehicle a request to the occupant for authorization information. When the occupant cannot be authorized or verified, the call center may contact one or more designated persons, security services, or law enforcement to report a stolen vehicle and to give the current location reading from the global positioning system (GPS) of the in-vehicle telematics unit.

Telematics vehicle security system 100 includes a mobile vehicle 110, a vehicle communication bus 112, a telematics unit 120, one or more vehicle-use sensors 140, one or more wireless carrier systems 160, one or more communication networks 162, one or more land networks 164, and one or more call centers 170. Mobile vehicle 110 may be a mobile vehicle such as a car or truck equipped with suitable hardware and software for transmitting and receiving voice and data communications.

Telematics unit 120 may include a digital signal processor (DSP) 122 connected to a wireless modem 124, a global positioning system (GPS) receiver or GPS unit 126, an in-vehicle memory 128, a microphone 130, one or more speakers 132, and an embedded or in-vehicle mobile phone 134. DSP 122 may also be referred to as a microcontroller, controller, host processor, or vehicle communications processor. GPS unit 126 may provide longitude and latitude coordinates of the vehicle. In-vehicle mobile phone 134 may be an analog, digital, dual-mode, dual-band, multi-mode or multi-band cellular phone.

DSP 122 executes various computer programs and computer program code that control programming and operational modes of electronic and mechanical systems within mobile vehicle 110. DSP 122 may control communications between telematics unit 120, wireless carrier system 160, and call center 170. A voice-recognition application may be installed in DSP 122 that can translate human voice input through microphone 130 to digital signals. For example, a vehicle alarm system may be armed with a verbal command that is translated by voice-recognition software of DSP 122. Alternatively, pushing buttons on an interface to telematics unit 120 may be recognized by a security application of DSP 122 as a signal to arm the alarm system. The interface to telematics unit 120 may include one or more buttons on the telematics unit, radio console, or associated keyboard or keypad.

DSP 122 generates and accepts digital signals transmitted between telematics unit 120 and a vehicle communication bus 112 that is connected to various electronic modules and sensors in mobile vehicle 110. These digital signals may activate the programming mode and operation modes, as well as provide for data transfers. Signals from DSP 122 may be translated into voice messages and sent out through speaker 132. One of the generated voice prompts may include a disarm alarm prompt given when an occupant has not disarmed a vehicle security system. The disarm alarm prompt may also include an audible tone, a repeating tone, a sequence of tones, a flashing light, a visual signal, or any combination thereof.

Mobile vehicle 110 via a vehicle communication bus 112 may send signals to various equipment and systems within mobile vehicle 110 to perform various functions such as unlocking a door, opening the trunk, setting personal comfort settings, and calling from telematics unit 120. In facilitating interactions among the various communication and electronic modules, vehicle communication bus 112 may use bus interfaces such as controller-area network (CAN), International Organization for Standardization (ISO) Standard 9141, ISO Standard 11898 for high-speed applications, and ISO Standard 11519 for lower speed applications.

Vehicle communication bus 112 is connected to one or more vehicle-use sensors 140 that monitor and take measurements from various mechanically and electronically controlled or monitored equipment of the vehicle. Vehicle-use sensors 140 may detect a vehicle entry when an occupant enters mobile vehicle 110. For example, vehicle entry may be detected by monitoring one or more door locks 142, one or more door latches 144, a vehicle occupancy detector 146, a steering column lock 148, door proximity sensor 150, or an engine ignition 152. Telematics unit 120 monitors for entry signals, which are received via vehicle communication bus 112 from vehicle-use sensors 140. Vehicle-use sensors 140, which are electrically coupled to telematics unit 120, provide an entry signal to telematics unit 120 when the vehicle is entered.

Mobile vehicle 110 via telematics unit 120 may send and receive radio transmissions from wireless carrier system 160. Wireless carrier system 160 may be any suitable system for transmitting a signal from mobile vehicle 110 to communication network 162.

Communication network 162 may comprise services from one or more mobile telephone switching offices and wireless networks. Communication network 162 may connect wireless carrier system 160 to land network 164. Communication network 162 may be any suitable system or collection of systems for connecting wireless carrier system 160 to mobile vehicle 110 and land network 164.

Land network 164 is a public-switched telephone network. Land network 164 may be an Internet protocol (IP) network. Land network 164 may be comprised of a wired network, an optical network, a fiber network, another wireless network, or any combination thereof. Land network 164 is connected to one or more landline telephones. Land network 164 may connect communication network 162 to call center 170. Communication network 162 and land network 164 may connect wireless carrier system 160 to a communication node or call center 170.

In this embodiment of the invention, call center 170 may include one or more voice and data switches 172, one or more communication services managers 174, one or more communication services databases 176, one or more communication services advisors 178, and one or more bus systems 180.

Call center 170 may be a location where many calls may be received and serviced at the same time, or where many calls may be sent at the same time. The call center may be a telematics call center, prescribing communications to and from telematics unit 120 in mobile vehicle 110. The call center may be a voice call center, providing verbal communications between an advisor in the call center and a subscriber in a mobile vehicle. The call center may contain each of these functions.

Call center 170 may contain one or more voice and data switches 172. Switch 172 may be connected to land network 164. Switch 172 may transmit voice or data transmissions from call center 170. Switch 172 also may receive voice or data transmissions from telematics unit 120 in mobile vehicle 110 through wireless carrier system 160, communication network 162, and land network 164. Switch 172 may receive from or send to one or more communication services managers 174 data transmissions via one or more bus systems 180. Communication services manager 174 may be any suitable hardware and software capable of providing requested communication services to telematics unit 120 in mobile vehicle 110. Communication services manager 174 may send to or receive from one or more communication services databases 176 data transmissions via bus system 180. Communication services manager 174 may send to or receive from one or more communication services advisors 178 data transmissions via bus system 180. Communication services database 156 may send to or receive from communication services advisor 178 data transmissions via bus system 180. Communication services advisor 178 may receive from or send to switch 172 voice or data transmissions.

Communication services manager 174 provides one or more of a variety of services, including enrollment services, navigation assistance, vehicle personalization, vehicle data upload, vehicle data download, replenish subscriber minutes, unlock/lock vehicle, flash lights, honk horn, perform diagnostic functions and perform vehicle tracking functions. Communication services manager 174 may transmit data to telematics unit 120 in mobile vehicle 110 through wireless carrier system 160, communication network 162, land network 164, voice and data switch 172, and bus system 180. Communication services manager 174 may store or retrieve data and information from communication services database 176. Communication services manager 174 may provide requested information to communication services advisor 178.

Communication services advisor 178 may be a real advisor or a virtual advisor. A real advisor is a human being in verbal communication with a user or subscriber in mobile vehicle 110 via telematics unit 120. A virtual advisor may be a synthesized voice interface responding to requests from telematics unit 120 in mobile vehicle 110. This virtual advisor may include a recorded message.

Communication services advisor 178 provides services to telematics unit 120 in mobile vehicle 110. Possible services provided by communication services advisor 178 are enrollment services, navigation assistance, real-time traffic advisories, directory assistance, roadside assistance, business or residential assistance, information services assistance, emergency assistance, and communications assistance. Communication services advisor 178 may communicate with telematics unit 120 in mobile vehicle 110 through wireless carrier system 160, communication network 162, and land network 164 using voice transmissions, or through communication services manager 174 and switch 172 using data transmissions.

Typically, mobile vehicle 110 initiate service request to call center 170 by sending a voice or digital-signal command to telematics unit 120 which in turn, sends an instructional signal or a voice call through wireless modem 124, in-vehicle mobile phone 134, wireless carrier system 160, communication network 162, and land network 164 to call center 170. This communication path is also used when telematics unit 120 needs call center 170 to authorize a vehicle entry.

FIG. 2 is a flow diagram of one embodiment of a telematics vehicle security method being enabled, in accordance with the present invention at 200. The process of enabling the security system of the present invention begins with the driver turning off the mobile vehicle, as seen at block 205. The driver may or may not want the security system enabled as seen at block 210. If not, the process ends without the security system being armed, as seen at block 215.

The driver who wants to enable or arm the security system may do so by inputting an arm alarm command, either through speaking a pre-defined verbal command or phrase that is recognized by voice-recognition software of an in-vehicle telematics unit or by depressing one or more buttons on a console, radio or keypad electronically connected to the in-vehicle telematics unit, as seen at block 220. For example, the driver may speak a command, such as "Turn security on" or "Activate alarm," to initiate the security system. An optional password or passcode may be entered verbally or by depressing one or more buttons to finish the enabling of the security system. The password or passcode may be predefined either through speaking a verbal password or phrase to be recognized by voice-recognition software of the in-vehicle telematics unit or by inputting a sequence of numbers into the keypad electronically connected to the in-vehicle in a setup mode of the security system. To complete enabling of the system, the driver might say, "Turn security on. Password: Starry night." In an alternative embodiment, the driver inputs a sequence of button pushes to enter an authorization code to enable the system. In either case, the driver has a predetermined amount of time after the system is activated, for example, one minute, to leave the vehicle and lock the doors before the security system is set to monitor for any entry into the vehicle.

FIG. 3 is a flow diagram of one embodiment of a method for authorizing use of a mobile vehicle with a telematics vehicle security system, in accordance with the present invention at 300. The driver returns to a mobile vehicle for which the security system has been enabled, as seen at block 305, unlocks a door, as seen at block 310, and hears audible alarm tones upon entry of the vehicle, as seen at block 315. Opening a door, entering the vehicle, attempting to start the car without disarming the alarm, movement within the passenger compartment of the vehicle, occupying the vehicle, or any other suitable action that can be detected by the telematics vehicle security system may trigger the audible alarm tones. Other suitable indicators may be given such as an audible tone, a repeating tone, a sequence of tones, a voice prompt, a flashing light, a visual signal, or a combination thereof.

Because of the audible tones, the driver knows that the armed alarm system needs to be disabled or disarmed. In this exemplary method, the driver says a password or inputs a button sequence to submit an authorization code to the telematics system, which is managing the vehicle security system. The driver may or may not say or input the authorization code correctly, as seen at block 320. When the password or button sequence is recognized by the telematics unit as matching a pre-authorized response stored in its memory, the security system is disarmed, as seen at block 325. When the password or button sequence is not recognized, the telematics unit automatically places a high-priority call to the call center to indicate a possible theft attempt, as seen at block 330. A digital flag indicating a possible theft in progress may be sent with the call. In response, the call center may try to communicate with the driver to verify and authorize the driver based on the ability of the driver to provide personal information, for example, that matches driver information in the database of the call center. The requested information may include an account number, addresses of a home or office, phone numbers, license numbers, telematics service preferences, or any other information that an intruder might not know.

FIG. 4 is a flow diagram of another embodiment of a method for authorizing use of a mobile vehicle with a telematics vehicle security system, in accordance with the present invention at 400. The telematics vehicle security method begins with arming an alarm system within the mobile vehicle, as seen at block 405. A driver or vehicle occupant initiates command signals to an in-vehicle telematics unit to enable or arm an alarm system by a verbal command or a button push. The verbal command might be, for example, a command such as "Set alarm system. Code: 1234," or "Alarm system on. Password: Tiger." The voice-recognition software of the telematics unit may be pre-programmed to recognize particular commands and optional authorization codes for arming and disarming the in-vehicle alarm system. After the telematics vehicle security system has been armed, the occupants of a vehicle may leave the vehicle and the vehicle security system will be armed after a predetermined amount of time. The telematics unit may be programmed with a programmed delay of, for example, one minute, after which the security system is activated.

After the alarm has been set, whenever the driver, occupant or an intruder enters that vehicle, the telematics unit may receive an entry signal from one or more vehicle-use sensors, as seen at block 410. Examples of vehicle-use sensors include a door unlock signal whereby the entry signal is generated when the doors are unlocked either manually or remotely; a door opening signal whereby the entry signal is generated when a switch located in the door jam is toggled; a door proximity sensor signal generated by a proximity sensor when a door is opened; an occupancy sensor signal generated when someone sits on a seat in the car; a motion sensor signal generated when movement occurs in the passenger compartment; an ignition attempt signal when a key is used to turn on the vehicle's engine, unlock the steering column, or operate the car in the accessories mode; or any other suitable vehicle-entry indicator.

After a predetermined amount of time, for example, ten seconds, the occupant hears a disarm alarm prompt provided by the in-vehicle telematics unit that is responding to the entry signal, as seen at block 415. The disarm alarm prompt may include an audible tone, a repeating tone, a sequence of tones, a voice prompt, a flashing light, a visual signal or any combination thereof. For example, a disarm alarm prompt might be "Please disarm security system", "Security code, please", or "What is your security code?"

The voice-recognition system of the telematics unit may determine a response to a disarm alarm prompt provided by the telematics vehicle security system when the entry signal is provided. The determination of whether the disarm alarm response is received begins with monitoring for a disarm alarm response, as seen at block 420. The disarm alarm response may include a verbal input or a button input, depending on how the method of authorization by the telematics unit is programmed. With the verbal input, the disarm alarm response might be a phrase or sequence of words. With button pushing, it might be a sequence of numbers received from a keypad of an embedded mobile phone, a radio panel, a console keyboard, or other in-vehicle device that is electronically connected to the telematics unit.

The telematics unit may or may not receive a disarm alarm response, as seen at block 425. In either case, an authorization procedure is initiated based on the disarm alarm response.

When the telematics unit determines it has received a disarm alarm response from the vehicle occupant, the telematics unit compares the response to a set of pre-authorized disarm alarm responses, as seen at block 430. The computer applications of the vehicle security system compares the disarm alarm response to a set of one or more pre-authorized responses, and the response given by the vehicle occupant may or may not match a pre-authorized response, as seen at block 435.

The use of the mobile vehicle may be authorized when the disarm alarm response matches one of the set of pre-authorized disarm alarm responses. The correct disarm alarm response is a response that matches a pre-authorized verbal response or sequence of button pushes, which may be evaluated by a voice-recognition or signal-recognition system employing computer applications within the telematics unit. When the telematics unit has not received an authorized disarm alarm response within a prescribed period of time such as one minute, the telematics unit may initiate the authorization procedure by optionally disabling the ignition of the vehicle or otherwise render the vehicle inoperable as seen at block 440, and automatically originate a call from the mobile vehicle to a call center, as seen at block 445. The authorization may not occur because no verbal or button-push response has been given or the telematics unit cannot verify that a disarm alarm response given to the disarm alarm prompt matches any pre-authorized response stored in the memory of the telematics unit. The authorization may not occur when the disarm alarm response has not be received within a prescribed period of time that had been pre-programmed into the unit. Whether or not the vehicle is rendered inoperable, the telematics unit automatically calls the telematics call center, as seen at block 445. The telematics service call center receives a call from the telematics unit whenever the disarm alarm response is not authorized within a prescribed period of time. The call comprises an identification number associated with the mobile vehicle and a set of global positioning system location coordinates of the mobile vehicle. The identification number may be a vehicle identification number, an electronic serial number of the telematics unit, the mobile identification number, the mobile directory number, or any number suitable for identifying the vehicle. The call may include a flag identifying it as a high priority call or a possible auto theft and may be routed within the call center to an appropriate or designated advisor. The information sent with the call may be matched with current information in the communication services database regarding the vehicle and the telematics subscriber of that vehicle. The information from the call initiation and communication services database is sent to an advisor who responds to the call.

The occupant of the mobile vehicle may receive an authorization inquiry from the call center when the disarm alarm response is not authorized within a prescribed period of time. The advisor inquires as to the identity of the vehicle occupant. For example, the advisor may ask for the name of the occupant and other personal information to verify the legitimacy of the occupant to drive the mobile vehicle. The occupant of the mobile vehicle may submit an authorization inquiry reply in response to the authorization inquiry.

The occupant of the vehicle may or may not be able to submit a correct authorization inquiry reply in response to the authorization inquiry, as seen at block 450. For example, the advisor may ask for information from the occupant including an account number, a password, a pin number, an address, a telephone number, a driver's license number, a credit card number, or any other personal information that may have been given by the telematics subscriber to the call center.

When the occupant is unable to give a correct authorization inquiry reply or information that would allow an advisor to authorize the occupant to drive the vehicle, the advisor may alert the driver that a call will be made to security if any attempt is made to steal the vehicle. The call center may warn the alleged thief to discontinue use of the vehicle. The advisor may initiate a call from the call center to a predetermined phone number or a security service based on the authorization inquiry reply. The advisor may call a security service, a predetermined phone number designated in the personal information of the telematics subscriber such as the owner, and/or law enforcement to report an unauthorized occupant of the mobile vehicle and a possible automotive theft, as seen at block 455. The advisor may give to the authorities information on the vehicle such as license number, make, model, color, year of manufacture and so forth. In addition, the advisor may provide location of the vehicle based on the GPS coordinates that were sent with the call. The call center may continue to monitor the location of the vehicle until the vehicle is recovered by keeping a connection with the telematics unit in the vehicle.

When the occupant is able to submit an authorization inquiry reply, i.e. supply correct information in response to questions on personal information of the subscriber, the call center may authorize the use of the mobile vehicle, as seen at block 460. This alternative verification provides authorization to a person, for example, who has forgotten the pre-authorized disarm alarm response that authorizes the occupant to drive the vehicle. Thus, when the telematics unit did not enable the ignition because it could not authorize the occupant, the ignition of the mobile vehicle still may be enabled based on the authorization inquiry response to the call center.

The vehicle occupant is authorized to drive the mobile vehicle, as seen at block 465, when a disarm alarm response has matched a pre-authorized response, as seen back at block 435, or alternatively, when the call center has authorized the use of the vehicle based on the authorization inquiry reply, as seen back at block 460. The authorization procedure may be completed after block 435 by discontinuing the disarm alarm prompt and/or enabling ignition of the mobile vehicle when the disarm alarm response is authorized within a prescribed period of time as seen at block 465, or when it is not authorized within a prescribed period of time by following the steps of blocks 440, 445, 450, 460 and then block 465.

While the embodiments of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

What is claimed is:

1. A method for authorizing use of a mobile vehicle, comprising:
   receiving an entry signal;
   providing a disarm alarm prompt from an in-vehicle telematics unit in response to the entry signal, the telematics unit configured to send and receive radio transmissions from a wireless carrier system;
   determining whether a disarm alarm response is received; and
   initiating an authorization procedure based on the disarm alarm response.

2. The method of claim 1 wherein the entry signal is selected from the group consisting of a door unlock signal, a door opening signal, a door proximity sensor signal, an occupancy sensor signal, a motion sensor signal, an ignition attempt signal, and a vehicle-entry indicator.

3. The method of claim 1 wherein the disarm alarm prompt is selected from the group consisting of an audible tone, a repeating tone, a sequence of tones, a voice prompt, a flashing light, and a visual signal.

4. The method of claim 1 wherein the disarm alarm response comprises a verbal input or a button input.

5. The method of claim 1 wherein determining whether the disarm alarm response is received comprises monitoring for a disarm alarm response and comparing the disarm alarm response to a set of pre-authorized disarm alarm responses.

6. The method of claim 5 wherein the use of the mobile vehicle is authorized when the disarm alarm response matches one of the set of pre-authorized disarm alarm responses.

7. The method of claim 1 wherein initiating the authorization procedure comprises enabling ignition of the mobile vehicle when the disarm alarm response is authorized within a prescribed period of time.

8. The method of claim 1 wherein initiating the authorization procedure comprises disabling ignition of the mobile vehicle and originating a call from the mobile vehicle to a call center when the disarm alarm response is not authorized within a prescribed period of time.

9. The method of claim 8 wherein the call comprises an identification number associated with the mobile vehicle and a set of global positioning system location coordinates of the mobile vehicle.

10. The method of claim 1 further comprising:
    receiving an authorization inquiry from a call center when the disarm alarm response is not authorized within a prescribed period of time;
    submitting an authorization inquiry reply in response to the authorization inquiry; and
    initiating a call from the call center to a predetermined phone number or a security service based on the authorization inquiry reply.

11. The method of claim 10 further comprising:
    enabling ignition of the mobile vehicle based on the authorization inquiry reply.

12. The method of claim 1 further comprising:
    arming an alarm system within the mobile vehicle based on one of a verbal command or a button push.

13. A system for authorizing use of a mobile vehicle, comprising:
    means for receiving an entry signal;
    means for providing a disarm alarm prompt from an in-vehicle telematics unit in response to the entry signal, the telematics unit configured to send and receive radio transmissions from a wireless carrier system;

means for determining whether a disarm alarm response is received; and means for initiating an authorization procedure based on the disarm alarm response.

14. The system of claim 13 further comprising:

means for receiving an authorization inquiry from a call center when the disarm alarm response is not authorized within a prescribed period of time;

means for submitting an authorization inquiry reply in response to the authorization inquiry; and means for initiating a call from the call center to a predetermined phone number or a security service based on the authorization inquiry reply.

15. The system of claim 14 further comprising:

means for enabling ignition of the mobile vehicle based on the authorization inquiry reply.

16. The system of claim 13 further comprising:

means for arming an alarm system within the mobile vehicle based on one of a verbal command or a button push.

17. A computer usable medium including a program for authorizing use of a mobile vehicle, comprising:

computer program code to receive an entry signal;

computer program code to provide a disarm alarm prompt from an in-vehicle telematics unit in response to the entry signal, the telematics unit configured to send and receive radio transmissions from a wireless carrier system;

computer program code to determine whether a disarm alarm response is received; and computer program code to initiate an authorization procedure based on the disarm alarm response.

18. The computer usable medium of claim 17 further comprising:

computer program code to receive an authorization inquiry from a call center when the disarm alarm response is not authorized within a prescribed period of time;

computer program code to submit an authorization inquiry reply in response to the authorization inquiry; and computer program code to initiate a call from the call center to a predetermined phone number or a security service based on the authorization inquiry reply.

19. The computer usable medium of claim 18 further comprising:

computer program code to enable ignition of the mobile vehicle based on the authorization inquiry reply.

20. The computer usable medium of claim 17 further comprising:

computer program code to arm an alarm system within the mobile vehicle based on one of a verbal command or a button push.

21. A vehicle security system, comprising:

an in-vehicle telematics unit including a global positioning system receiver and an embedded cell phone, the telematics unit configured to send and receive radio transmissions from a wireless carrier system;

a voice-recognition system operably connected to the telematics unit; and a vehicle-use sensor electrically coupled to the telematics unit;

wherein the vehicle-use sensor provides an entry signal to the telematics unit when the vehicle is entered, the voice-recognition system determines a response to an alarm prompt provided by the telematics unit when the entry signal is provided, and a call is made to a call center when the response to the alarm prompt is not authorized.

22. A method for authorizing use of a mobile vehicle, comprising:

receiving an entry signal;

providing a disarm alarm prompt from an in-vehicle telematics unit in response to the entry signal, the telematic unit configured to send and receive radio transmissions from a wireless carrier system;

determining whether a disarm alarm response is recieved;

initiating an authorization procedure based on the disarm alarm response; and receiving an authorization inquiry from a call center when the disarm alarm response is not authorized within a prescribed period of time.

* * * * *